(12) United States Patent
Hira et al.

(10) Patent No.: US 10,709,240 B2
(45) Date of Patent: Jul. 14, 2020

(54) UNIVERSAL UNDER CABINET MOUNTING BRACKET SYSTEM

(71) Applicants: Bobby Hira, Shakopee, MN (US);
James Edward Bokusky, Carver, MN (US)

(72) Inventors: Bobby Hira, Shakopee, MN (US);
James Edward Bokusky, Carver, MN (US)

(73) Assignee: BBY Solutions, Inc., Richfield, MN (US)

( * ) Notice: Subject to any disclaimer, the term of this patent is extended or adjusted under 35 U.S.C. 154(b) by 0 days.

(21) Appl. No.: 15/875,003

(22) Filed: Jan. 19, 2018

(65) Prior Publication Data

US 2019/0223593 A1  Jul. 25, 2019

(51) Int. Cl.
| | | |
|---|---|---|
| A47B 77/12 | (2006.01) | |
| A47B 77/08 | (2006.01) | |
| F16M 13/02 | (2006.01) | |
| A47B 95/00 | (2006.01) | |

(52) U.S. Cl.
CPC .............. *A47B 77/08* (2013.01); *A47B 77/12* (2013.01); *F16M 13/022* (2013.01); *A47B 95/008* (2013.01)

(58) Field of Classification Search
CPC ......... A47B 77/08; A47B 77/00; A47B 77/04; A47B 77/14; A47B 77/12; A47B 77/16; A47B 2077/025; F16M 13/022
USPC .................... 248/201, 674; 312/245; 219/756
See application file for complete search history.

(56) References Cited

U.S. PATENT DOCUMENTS

| | | | | |
|---|---|---|---|---|
| 3,098,423 A * | 7/1963 | Giannini | ............. | F24C 15/2071 |
| | | | | 126/299 D |
| 3,822,049 A * | 7/1974 | Saunders | ................ | B60R 11/02 |
| | | | | 248/223.41 |
| 4,666,113 A * | 5/1987 | Itoh | ........................ | H05B 6/642 |
| | | | | 219/756 |
| 4,753,406 A * | 6/1988 | Kodama | ................ | A47B 77/02 |
| | | | | 248/327 |
| 4,796,850 A | 1/1989 | Aramaki | | |
| 5,676,440 A | 10/1997 | Garber et al. | | |
| 6,341,754 B1 * | 1/2002 | Melito | .................... | A47B 77/08 |
| | | | | 248/201 |
| 7,129,452 B2 * | 10/2006 | Cho | ..................... | H05B 6/6429 |
| | | | | 219/756 |
| 9,897,331 B2 * | 2/2018 | Bruin-Slot | .......... | F24C 15/2071 |
| 2015/0041621 A1 * | 2/2015 | Penuel | .................... | F24C 15/30 |
| | | | | 248/674 |

* cited by examiner

*Primary Examiner* — Nkeisha Smith
(74) *Attorney, Agent, or Firm* — Tysver Beck Evans

(57) ABSTRACT

A system for mounting a microwave or other appliance to the underside of a cabinet includes an under-cabinet mounting assembly. The mounting assembly is made up of a plurality of inside the cabinet support members, an under-cabinet base plate, an appliance mounting plate and a plurality of fasteners. First fasteners are engaged to and extend from the plurality of inside the cabinet support members to fixedly engage the under-cabinet base plate. A second plurality of fasteners are engaged to and extend from the under-cabinet base plate to the appliance mounting plate. A third plurality of fasteners are engaged to and extending from the appliance mounting plate to the appliance. The system may also include a wall mountable rear support assembly for supporting the rear and or bottom surfaces of the appliance.

6 Claims, 10 Drawing Sheets

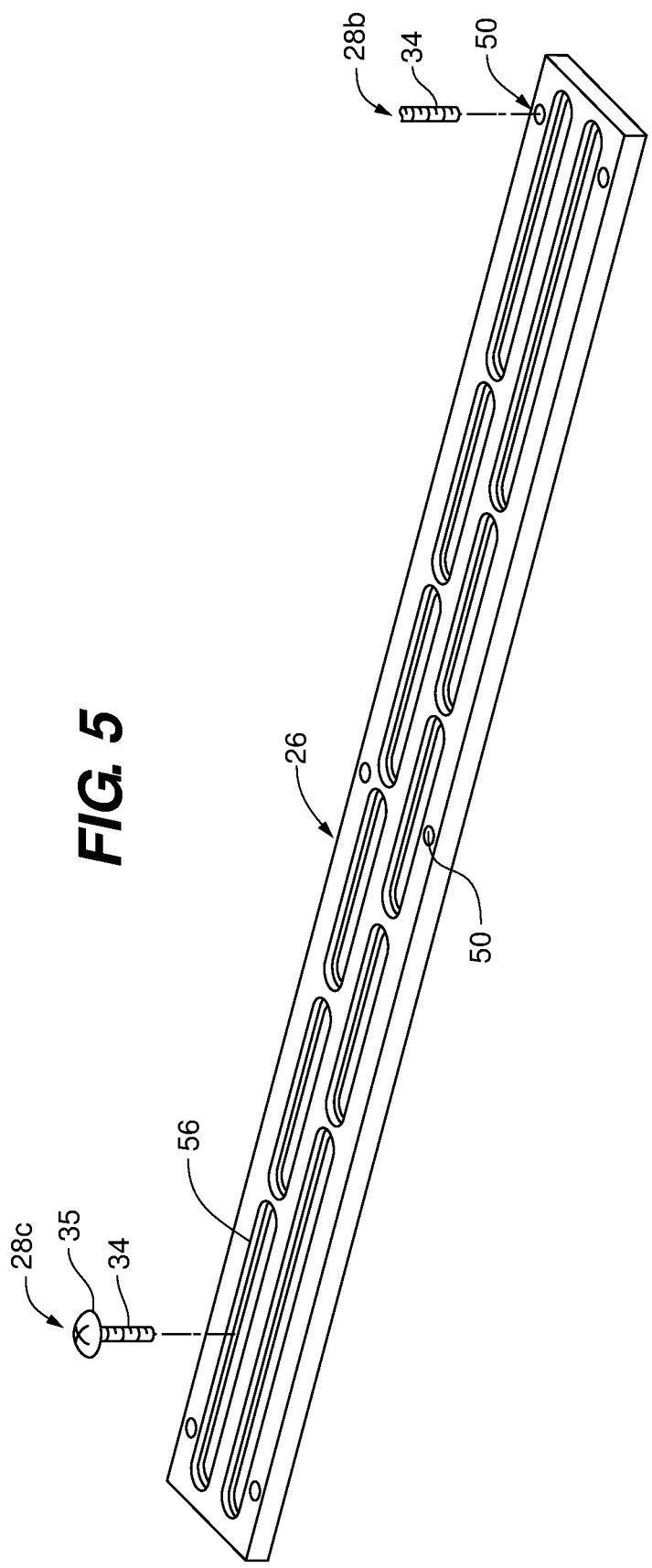

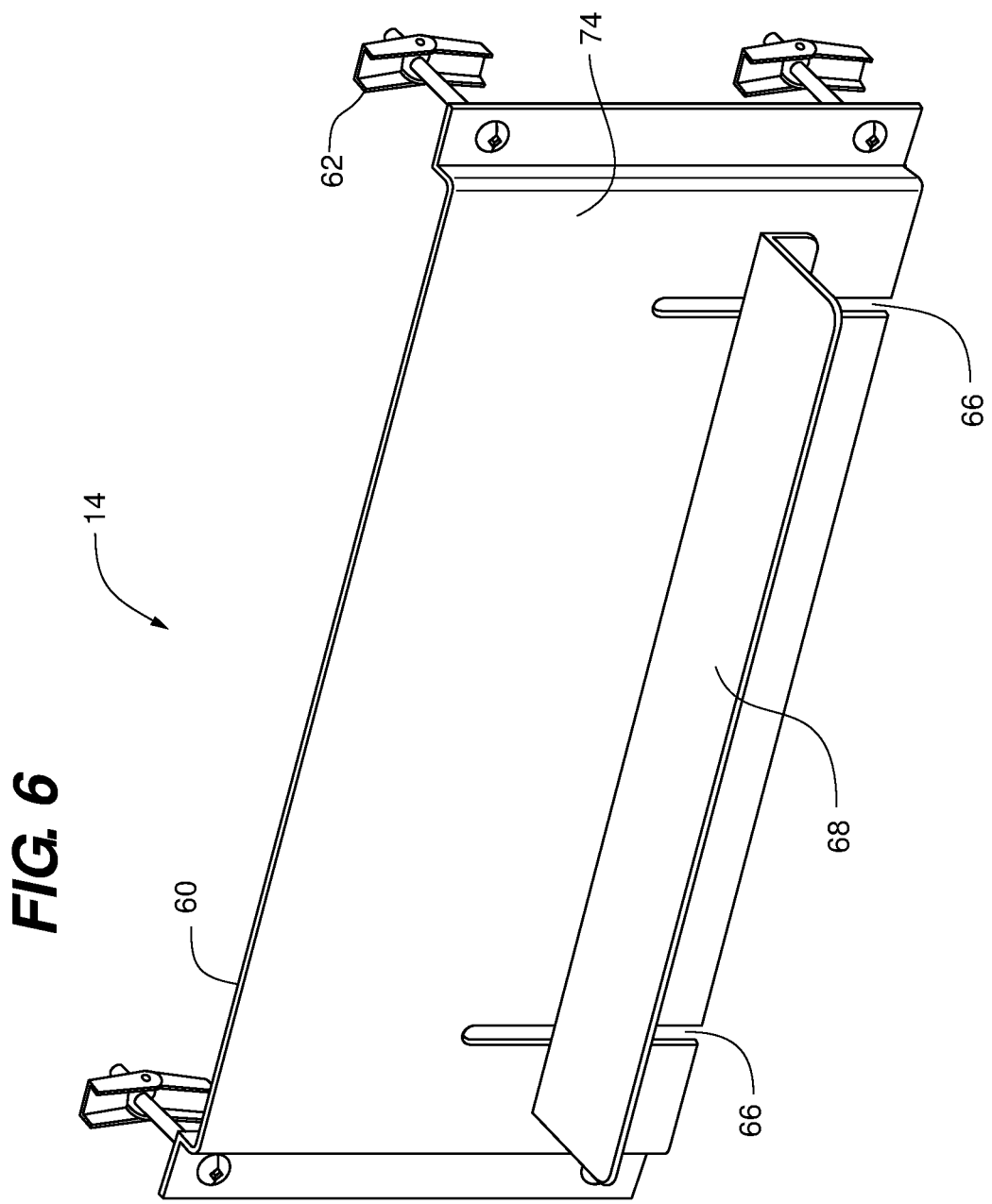

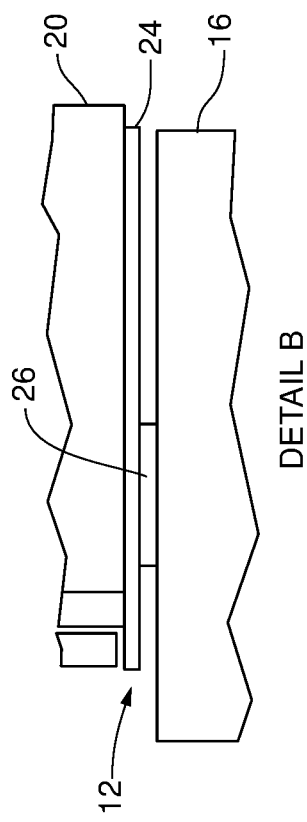
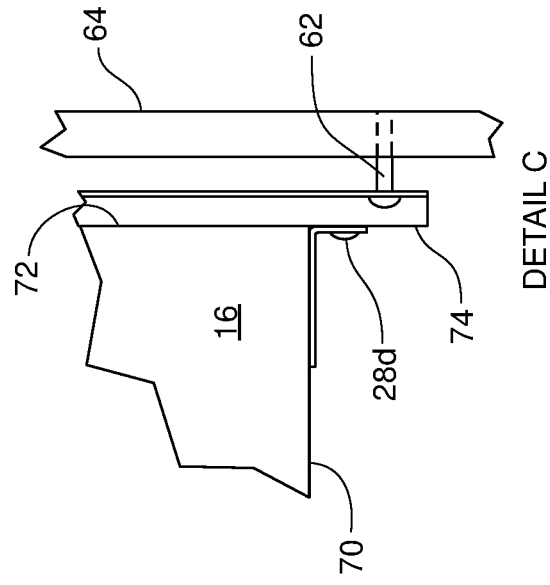
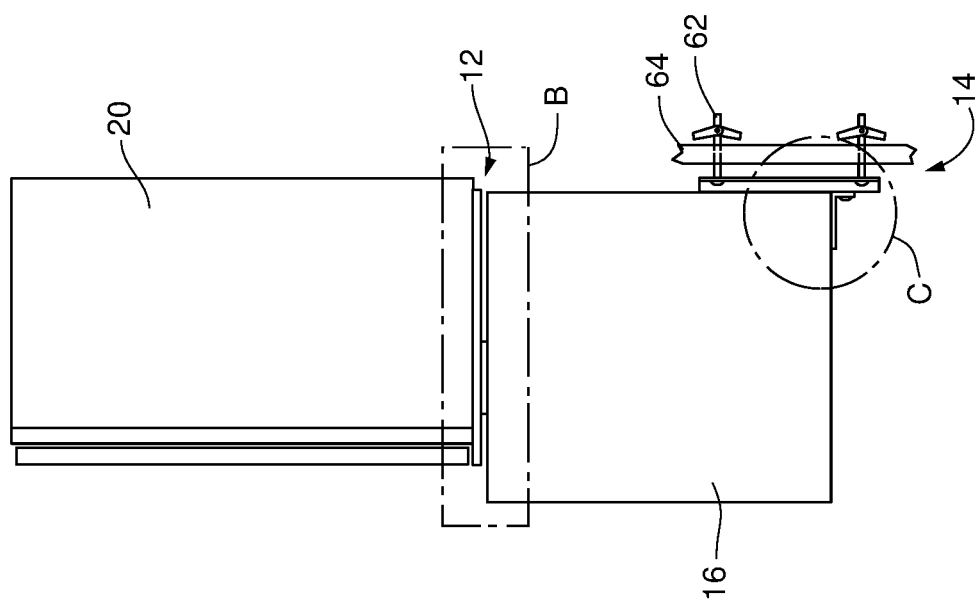

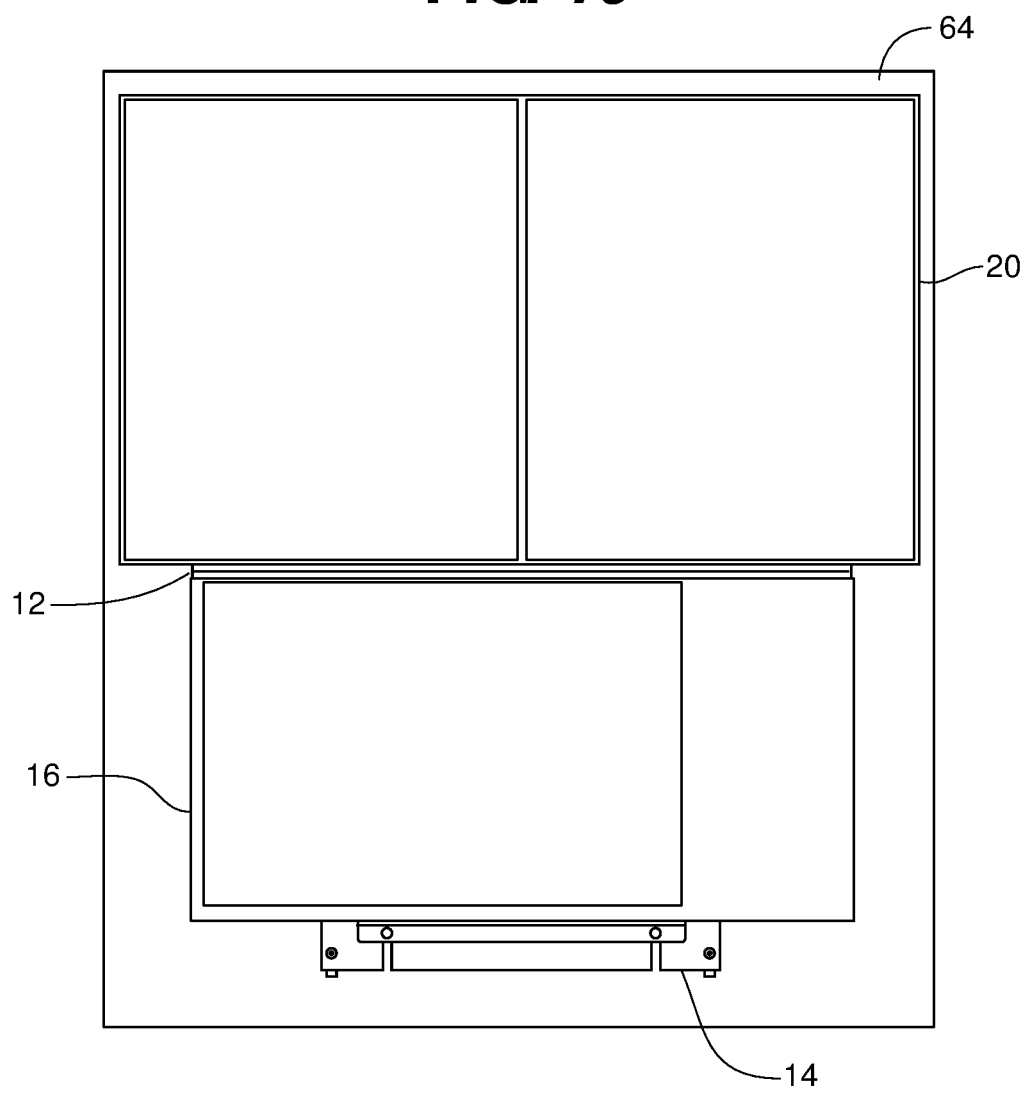

UNIVERSAL UNDER CABINET MOUNTING BRACKET SYSTEM

FIELD OF THE INVENTION

Embodiments of a universal mounting bracket system are described herein. More particularly, the present disclosure is directed to embodiments of a mounting bracket system for use in mounting appliances under a cabinet and against a wall. Some specific embodiments of the mounting bracket system described herein, are configured to provide a mechanism for mounting any type of microwave oven to the underside of a cabinet.

SUMMARY

Currently over the range (OTR) microwave ovens (hereinafter: "microwaves") are secured to the underside of a cabinet using a variety of screws, bolts, plates, brackets and other fasteners hardware. Lack of industry standards has led to a situation wherein the mounting hardware used for a given microwave is often unique to that microwave. Thus, when a microwave is replaced, often new mounting hardware must be used to accommodate the new microwave's unique mounting interface. This replacement process will often result in new and multiple holes being drilled or otherwise formed in the cabinet base and in some cases to the wall behind the microwave. If a microwave is replaced multiple times in this manner, the cabinet base and even the wall behind the microwave may become structurally unsound.

Embodiments described herein provide a universal under cabinet mounting bracket system which may be used to secure any type of microwave under a cabinet regardless of the configuration of the microwave's mounting interface. The system allows the same mounting hardware to be used with any of a variety of microwaves regardless of the differences exhibited by their mounting interface such that when a microwave is replaced with a different model, the new microwave is engaged by and mounted to the bracket system already in place with no further holes or other damage being imparted to the above cabinet or walls adjacent to the microwave.

Embodiments of the universal under cabinet mounting bracket system are adjustable so as to accommodate nearly any size, shape, or particular configuration of the microwave or its built-in mounting interfaces.

In some embodiments, the system includes a top plate assembly for mounting a microwave to the underside of a cabinet as well as a rear bracket assembly for supporting or bracing the microwave against the wall behind the microwave.

BRIEF DESCRIPTION OF THE DRAWINGS

FIG. 5 is a perspective view of the microwave mounting plate of the under-cabinet mounting assembly shown in FIG. 1.

FIG. 6 is a perspective view of the wall plate and adjustable support bracket of the rear support assembly shown in FIG. 1

FIG. 7 is a side view of the assemblage shown in FIGS. 2 and 5, but with the under-cabinet mounting assembly depicted engaged to the cabinet base and microwave; and the rear support assembly shown engaged in position to support the bottom and rear surfaces of the microwave.

FIG. 8 is a detailed view of the interface of the under-cabinet mounting assembly the cabinet base and microwave shown in FIG. 7.

FIG. 9 is a detailed view of the interface of the rear support assembly a support wall and the base and rear surfaces of the microwave shown in FIG. 7.

FIG. 10 is a frontal view of the assemblage shown in FIG. 7.

DETAILED DESCRIPTION

Figure 1:
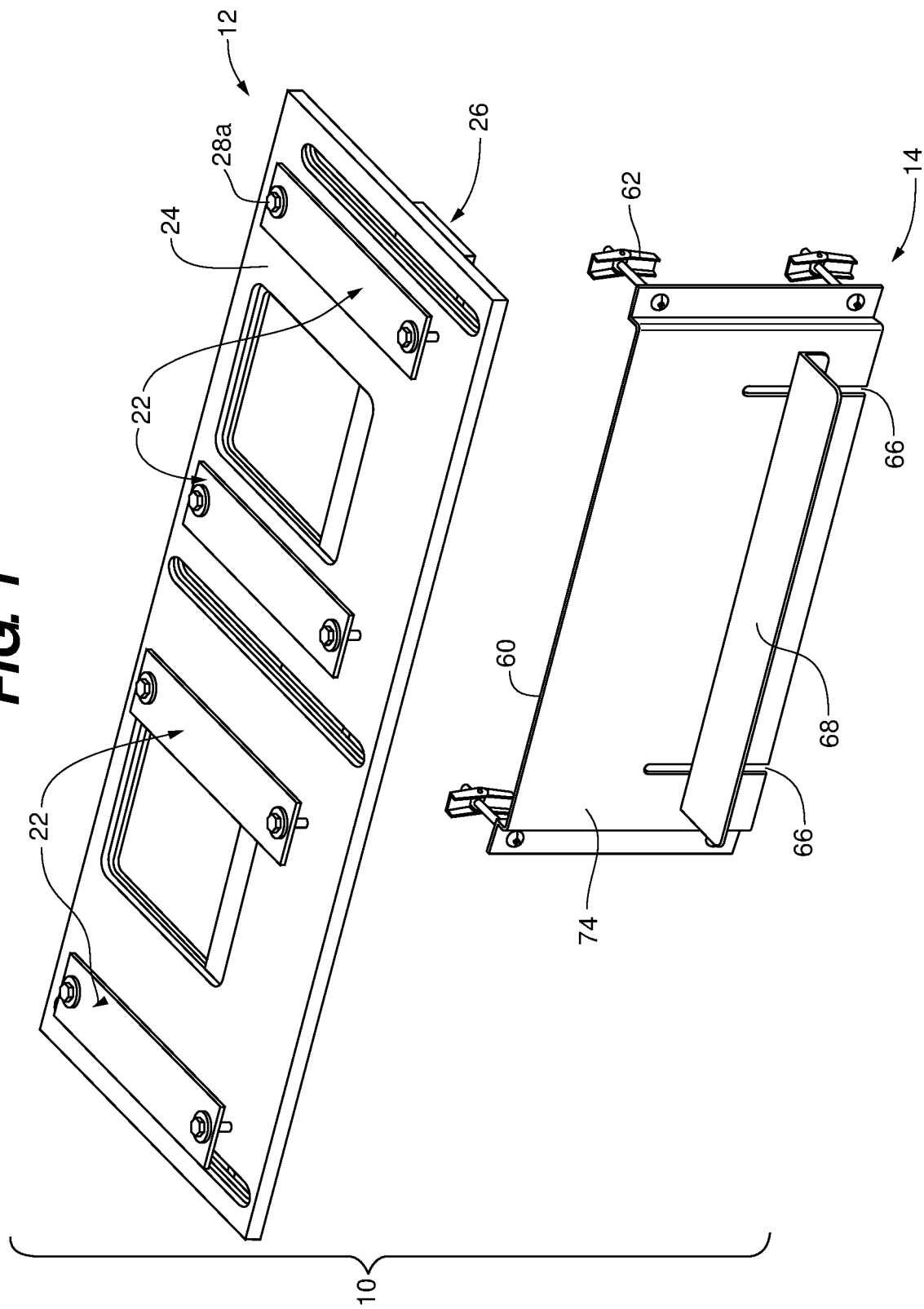
FIG. 1 is a perspective view of an embodiment of the universal mounting bracket system including a under cabinet mounting assembly and a rear support assembly.

In FIG. 1 an embodiment of the universal mounting bracket system 10 is shown comprising an under-cabinet mounting assembly 12 and a wall mountable rear support assembly 14.

Figure 2:
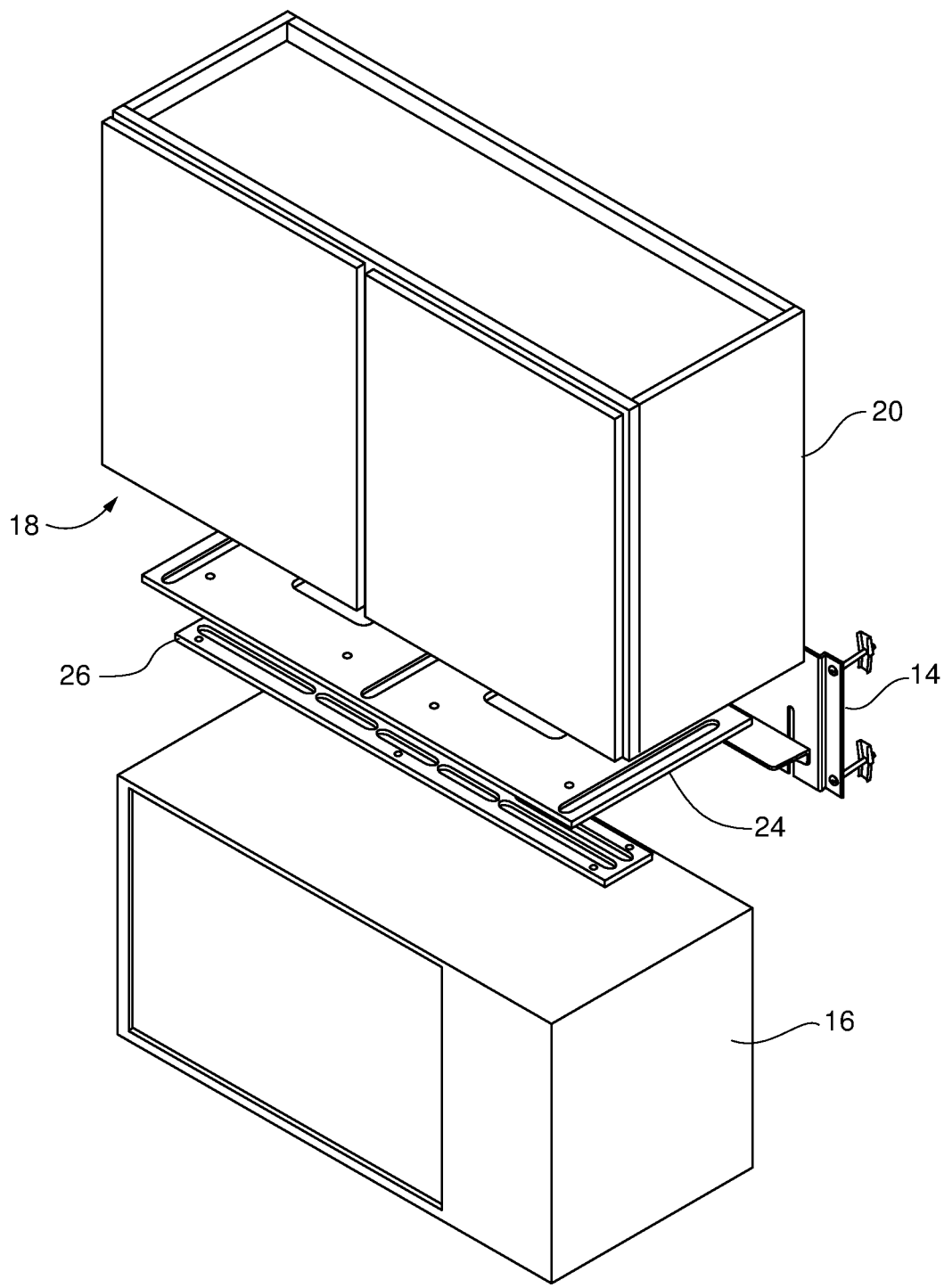
FIG. 2 is a perspective, partially exploded view of the system shown in FIG. 1 and with a cabinet and microwave depicted prior to the system being engaged to either.

Together, the assemblies 12 and 14 provide a mechanism for attaching a microwave or other appliance 16, such as may be seen in FIG. 2, to the underside 18 of a cabinet 20, and to provide rear bracing as well as bottom support to the appliance 16. When properly installed the system 10 may be adjusted to allow a wide range of appliances of various sizes and shapes to be engaged in the manner shown in FIG. 2 and without the need to replace the system 10 each time an old appliance is replaced with a new one having a different size, shape, make or model.

Returning to FIG. 1, it should be appreciated that the assemblies 12 and 14 have numerous component parts respectively. Beginning with the under-cabinet mounting assembly 12, in the embodiment shown the under-cabinet mounting assembly 12 is comprised of a plurality of inside the cabinet support members 22, which are mechanically engaged to an under-cabinet base plate 24, which is in turn mechanically engaged to a microwave or appliance mounting plate 26. The mounting plate 26 is finally engaged to the microwave or appliance 16. The general arrangement of components of the under-cabinet mounting assembly 12 positioned between and external to the cabinet 20 and appliance 16 is shown in side profile view in FIGS. 7 and 8.

Figure 3:
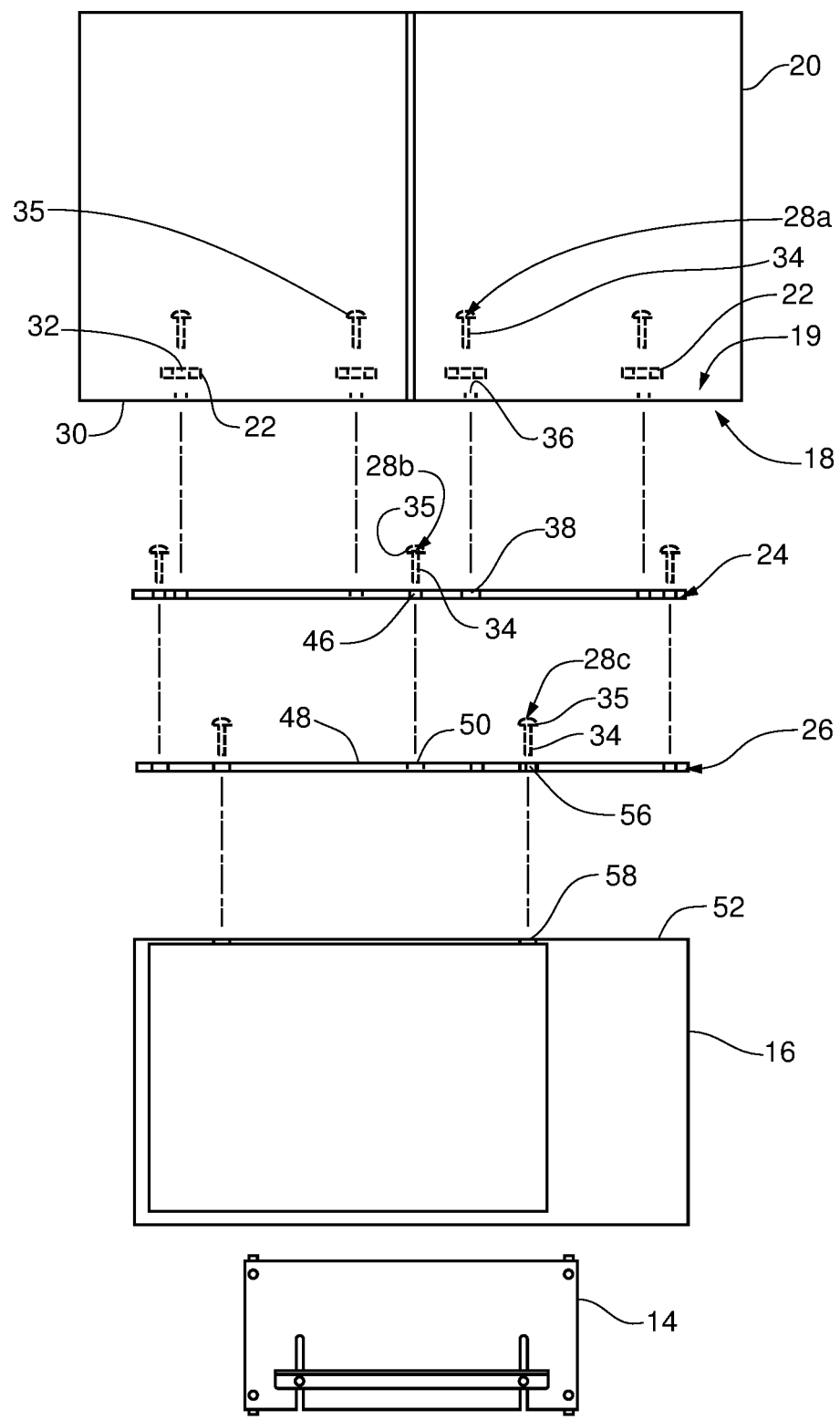
FIG. 3 is a front schematic view of the assemblage of components of the system, as well as the cabinet and microwave shown in FIG. 2, and depicting the manner in which they are engaged together.

A variety of fasteners 28a 28b and 28c, such as for example screws, or bolts extend through various through holes or openings 32 in the aforementioned components and engage other openings in adjacent structures, as well as the cabinet base 30 and microwave or appliance 16 to engage one to the other such as in the manner shown in FIG. 3. The nature of these engagements and the particular configurations of the components that make up the under-cabinet mounting assembly 12 and wall mountable rear support assembly 14 are illustrated in FIGS. 1 and 4-6.

As may be seen in FIGS. 1 and 3 the cabinet support members 22 rest against the top or interior side 19 of the cabinet base 30. Each support member 22 has at least one fixed position fastener opening 32 which corresponds to the position of a fixed position opening 36 through the base member 30 of the cabinet 20. A first plurality of fasteners 28a, each include an engagement shaft 34 that extends through the openings 32 and 36 to mechanically engage a fixed position opening 38 in the under-cabinet base plate 24, positioned against the underside surface 18 of the cabinet base 30. Engagement shaft 34 may be threaded or otherwise retainingly engaged to the opening 38 defined by the under-cabinet base plate 24.

Fasteners 28a have a support head 35 whose diameter or area is larger than the fastener opening 32 defined by the support member 22. In some embodiments, the support member 22 is an elongate plate of metal or other material sufficient to engage and support the fasteners 28a. In at least one embodiment the support member 22 is a washer or similar device capable of engaging the support head 35 of the fastener 28a and preventing the support head 35 from passing through the fastener opening 32.

As a result of the construction and arrangement of the support members 22 positioned on the interior side 19 of the cabinet base 30 and fasteners 28a passing therethrough and securing the under-cabinet base plate 24 against the underside or exterior surface 18 of the cabinet base 30; the under-cabinet base plate 24 is in effect suspended underneath the cabinet 20 and in position to engage the appliance mounting plate 26 in the manner shown in FIGS. 1-3.

Figure 4:
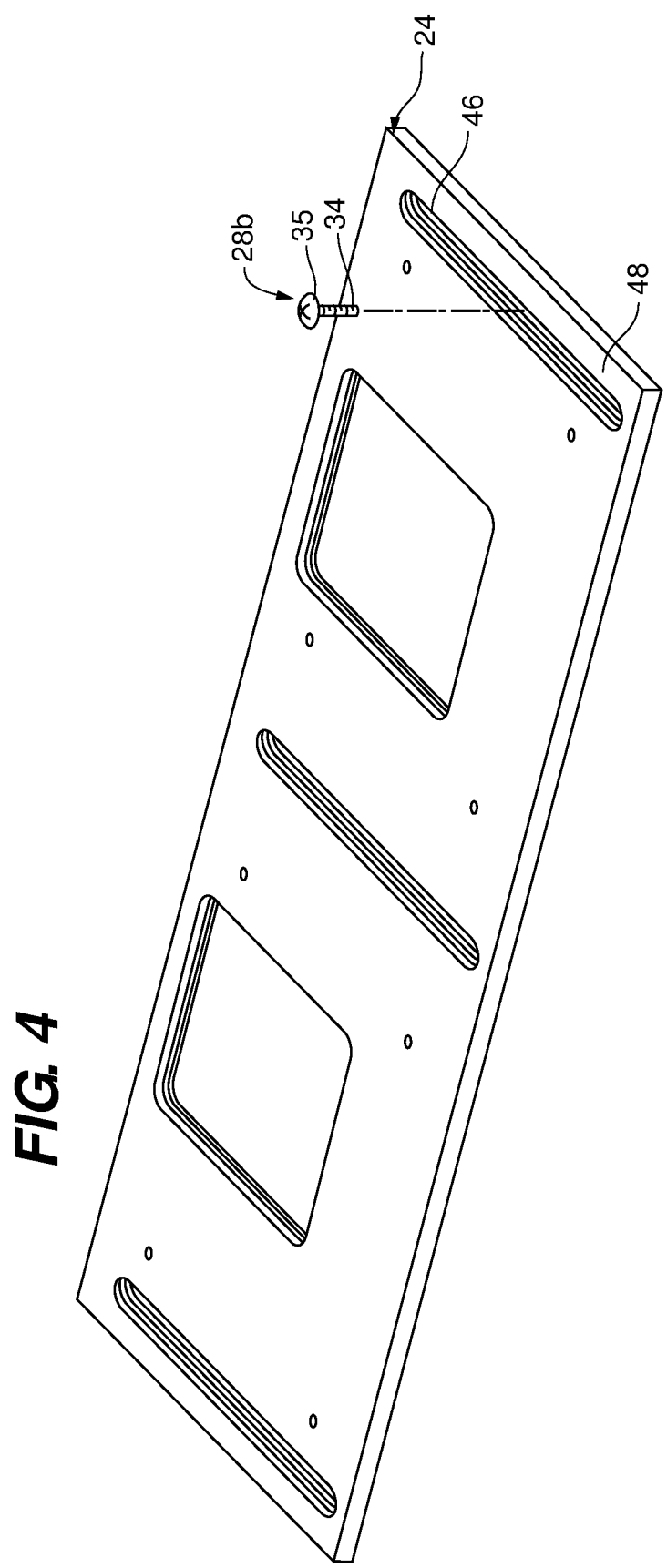
FIG. 4 is a perspective view of the base plate of the under-cabinet mounting assembly shown in FIG. 1.
Figure 11:
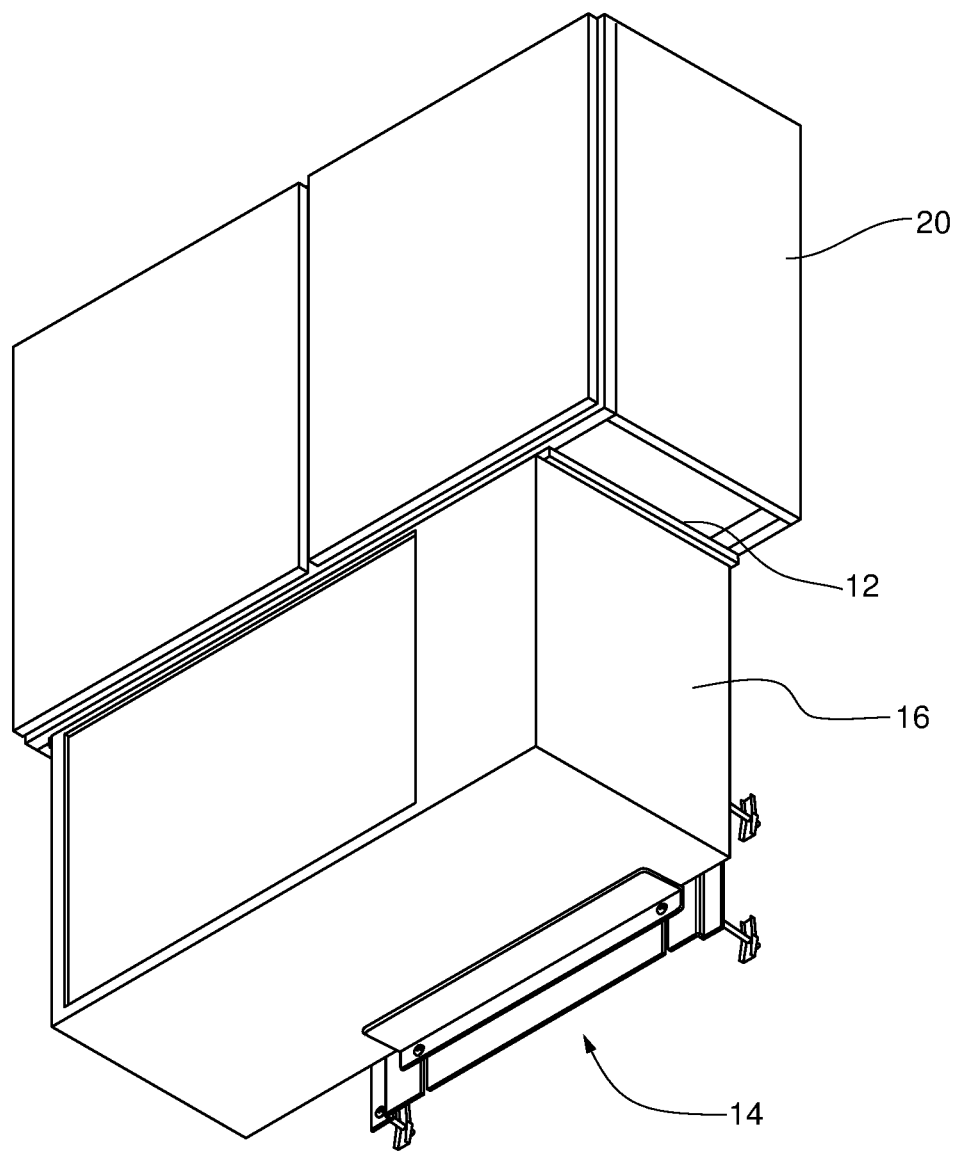
FIG. 11 is a bottom perspective view of a microwave mounted to a cabinet using the system shown in FIG. 1.

As is shown in FIGS. 3-5 the under-cabinet base plate 24 defines a plurality of base plate adjustment slots 46 through which fastener engagement shafts 34 of a second plurality of fasteners 28b may pass. The second plurality of fasteners 28b, which may be of the same type or different than those of the first plurality 28a, likewise have support heads 35 that engage the adjacent surface 48 of the plate 24 in the manner shown in FIG. 4. The length of the engagement shaft 34 is sufficient to allow the shaft 34 to pass entirely through the base plate slot 46 and threadingly engage a fixed position opening or receiver hole 50 located on and defined by the appliance mounting plate 26 as shown in FIG. 5.

By passing the engagement shaft 34 of the fasteners 28b through the base plate adjustment slots 46 of the under-cabinet base plate 24, in the manner shown in FIG. 4, and fixing the protruding engagement shaft 34 into place within the receiver holes 50 of the appliance mounting plate 26, the mounting plate 26 is movable or adjustable in any direction and degree as defined by the size and shape of the base plate adjustment slots 46. In the embodiment show, the base plate slots 46 provide the mounting plate 26 with a single and common (parallel) axial path of adjustability (front to back relative to the cabinet 20) limited only by the length of the slot and the size of the under-cabinet base plate 24.

As is best shown in FIG. 3, a microwave or other appliance 16 is engaged along its top exterior surface 52 to the appliance mounting plate 26 in the same manner that the mounting plate 26 is engaged to the under-cabinet base plate 24.

Engagement shafts 34 of a third plurality of fasteners 28c pass through the mounting plate adjustment slots 56 of the appliance mounting plate 26. The protruding ends of the engagement shafts 34 are received by and threaded fixed position receiver holes 58 located on the exterior surface 52 of the appliance 16 and defined thereby. In the embodiment shown in FIGS. 3 and 5 the mounting plate 26 defines a plurality of mounting plate slots 56 in one or more rows or other arrangements of the slots, so as to allow a diverse variety and highest practicable possibility of slot to appliance receiver hole correspondence. The more mounting plate slots 56 provided by the mounting plate 26, the greater potential overlap that one or more mounting plate slots 56 (preferably at least two) will spatially overlap with the receiver holes 58 of the appliance 16; thereby allowing the fasteners 28c to engage the mounting plate 26 to any of a variety of appliances equipped with receiver holes 58 in the manner shown in FIG. 3

During initial installation of the under-cabinet mounting assembly 12, the microwave or appliance 16 is first connected to the appliance mounting plate 26 with fasteners 28c in the manner described above. Then the mounting plate 26 is connected to the under-cabinet base plate 24, using fasteners 28b. The assemblage of the appliance 16, mounting plate 26 and under-cabinet base plate 24 are then held in place under the cabinet 20 and then secured to the cabinet base 30 using fasteners 28a and support members 22. Once the aforementioned components of the under-cabinet mounting assembly 12 are arranged and connected to the cabinet base 30 and appliance 16, exposed fasteners 28a, 28b and/or 28c are tightened to secure the appliance 16 into its final desired position relative to the cabinet 20.

Where the appliance 16 is small or sufficiently light in weight, engaging the appliance 16 to the cabinet 20 with the under-cabinet mounting assembly 12 alone will be sufficient to safely and securely hold the appliance in the desired mounted position. In many instances however, it may be necessary or desirable to provide additional support to the bottom and/or rear of the appliance 16 to ensure that its position is secured and its weight not straining the structure of the cabinet 20. Where such additional support is to be provided the system 10 includes a wall mountable rear support assembly 14 such as may be seen in FIGS. 1-3 and 6.

The wall mountable rear support assembly 14 as shown in FIGS. 1-3 and 6 is comprised of a wall plate 60 with fasteners 62 such as dry wall anchors, screws or other wall fixation devices for securing the wall plate 60 to a vertical surface of the wall 64 positioned behind the microwave or appliance 16 such as in the manner shown in FIG. 7. The wall plate 60 defines at least two vertical slots 66 which a support bracket 68 may be vertically adjusted relative thereto so as to engage the bottom 70 and rear 72 surfaces of the microwave or appliance 16 such as in the manner best shown in FIGS. 7 and 9.

As with the under-cabinet mounting assembly 12 which uses a variety of fasteners 28a, 28b and 28c to assemble and secure the components together, so too does the wall mountable rear support assembly 14 utilize fourth fasteners 28d such as screws or bolts to fix the support bracket 68 to the front surface 74 of the wall plate 60, along each of the slots 66 such as in the manner shown in FIGS. 7 and 9-11. By loosening or removing fasteners 28d from the rear support assembly 14, the bracket 68 may be moved vertically in an up and down direction relative to the slots 66 so as to accommodate a variety of sizes of microwaves or appliances 16.

Figure 12:
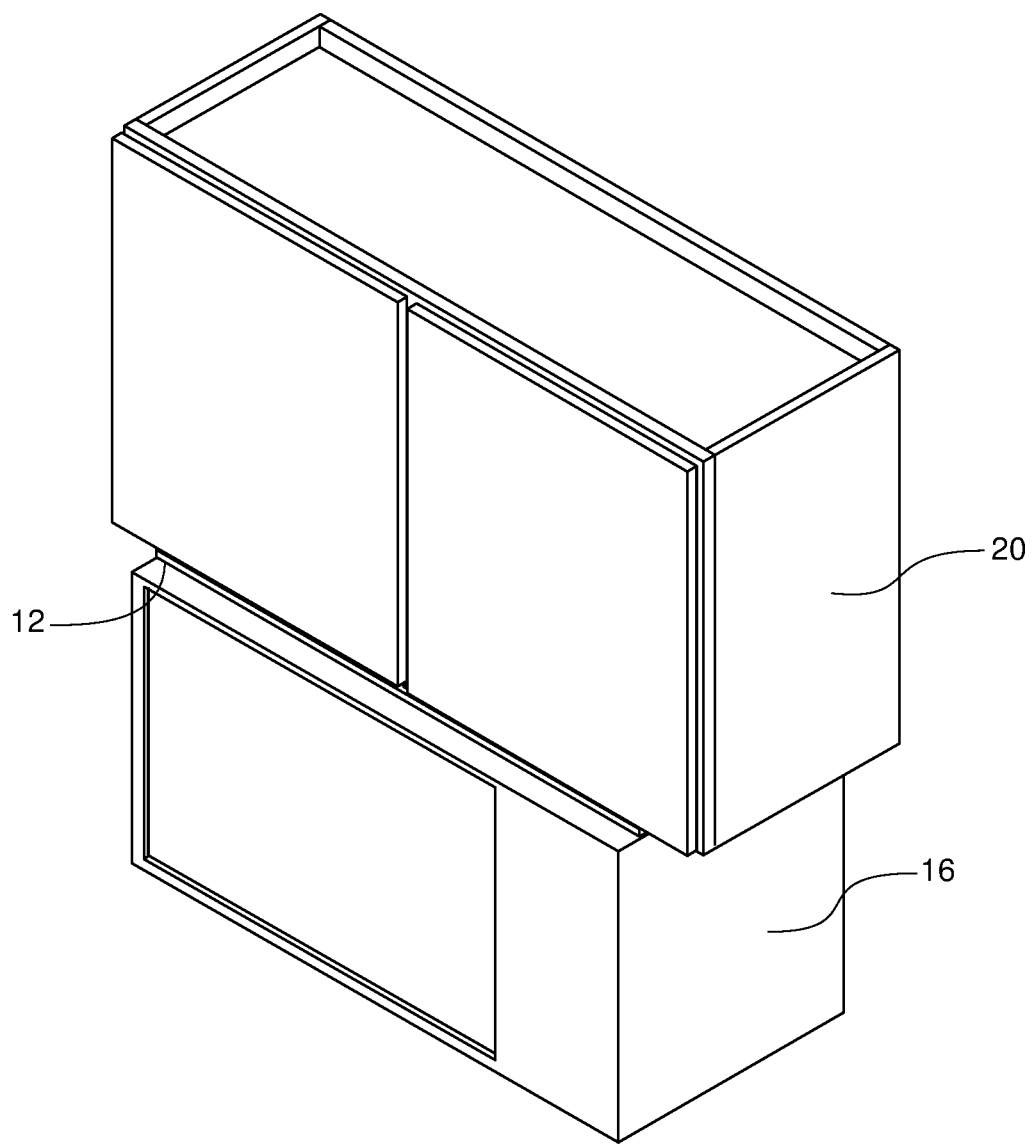
FIG. 12 is a top perspective view of a microwave mounted to a cabinet using the system shown in FIG. 1.

When fully assembled and engaged with the cabinet 20, appliance 16 and wall 64, the system 10 of the present disclosure is effective in supporting the microwave or appliance 16 of nearly any size and shape, and also is extremely discrete in its appearance. For example, while a portion of the wall mountable rear support assembly 14 may be visible from below the microwave or appliance 16 such as may be seen in FIG. 11, a casual observer looking at the assemblage directly on or from above will see only a thin portion of the under-cabinet mounting assembly 12, visible between the cabinet 20 and microwave or appliance 16, such as in the manner illustrated in FIG. 12. This discrete appearance, plus the ability of the system 10 to be used repeatedly with the same cabinetry as microwave or appliances are switched out and replaced makes the present system an ideal mounting mechanism for use in retail environments or others where the display of the microwave or appliance 16 is of key importance.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A system for mounting an appliance to an underside of a cabinet, the system comprising:
   an under-cabinet mounting assembly, the under-cabinet mounting assembly comprised of a plurality of inside the cabinet support members, an under-cabinet base plate, an appliance mounting plate that defines a plurality of mounting plate adjustment slots, and a first plurality of fasteners engaged to and extending from the plurality of inside the cabinet support members to fixedly engage the under-cabinet base plate, a second plurality of fasteners engaged to and extending from the under-cabinet base plate to the appliance mounting plate, a third plurality of fasteners engaged to and extending from the plurality of mounting plate adjustment slots of the appliance mounting plate, the plurality of mounting plate adjustment slots being more numerous than the third plurality of fasteners;
   the under-cabinet base plate defines a plurality of base plate adjustment slots, each of the plurality of base plate adjustment slots configured to pass an engagement shaft of at least one of the second plurality of fasteners therethrough.

2. The system of claim 1, wherein the plurality of inside the cabinet support members are engaged to a base member of the cabinet, the first plurality of fasteners each having a securement head and an engagement shaft extending therefrom, the engagement shaft extending through an opening in one of the plurality of inside the cabinet support members and through an opening in the cabinet base member to engage a fixed receiver opening defined by the under-cabinet base plate.

3. The system of claim 1, wherein each of the second plurality of fasteners comprise a securement head with the engagement shaft extending therefrom, the securement head of the at least one of the second plurality of fasteners being engaged to the under-cabinet base plate, the engagement shaft extending through one of the base plate adjustment slots and engaging a fixed receiver opening defined by the appliance mounting plate.

4. The system of claim 1, wherein each of the third plurality of fasteners comprise a securement head with an engagement shaft extending therefrom, the securement head of at least one of the third plurality of fasteners being engaged to the appliance mounting plate, the engagement shaft extending through one of the mounting plate adjustment slots and engaging a fixed receiver opening defined by the appliance.

5. The system of claim 1, further comprising a wall mountable rear support assembly, the wall mountable rear support assembly comprising:
   a wall plate with a plurality of anchors for anchoring the wall plate to a wall, the wall plate defining at least two vertical slots, and
   a support bracket, the support bracket configured for securement to the wall plate by a fourth plurality of fasteners, each of the fourth plurality of fasteners configured to engage the support bracket and pass through one of the vertical slots and secure a position of the support bracket to the wall plate; the support bracket engaged to at least one of a rear surface of the appliance and a bottom surface of the appliance.

6. A system for mounting an appliance to an underside of a cabinet, the system comprising:
   an under-cabinet mounting assembly, the under-cabinet mounting assembly comprised of a plurality of inside the cabinet support members, an under-cabinet base plate, an appliance mounting plate and a first plurality of fasteners engaged to and extending from the plurality of inside the cabinet support members to fixedly engage the under-cabinet base plate, a second plurality of fasteners engaged to and extending from the under-cabinet base plate to the appliance mounting plate, a third plurality of fasteners engaged to and extending from the appliance mounting plate; and
   a wall mountable rear support assembly, the wall mountable rear support assembly comprising a wall plate and a support bracket,
   the wall plate having a plurality of anchors for anchoring the wall plate to a wall, the wall plate defining at least two vertical slots,
   the support bracket configured for securement to the wall plate by a fourth plurality of fasteners, each of the fourth plurality of fasteners configured to engage the support bracket and pass through one of the vertical slots and secure a position of the support bracket to the wall plate; the support bracket engaged to at least one of a rear surface of the appliance and a bottom surface of the appliance.

* * * * *